United States Patent [19]

Brovont

[11] Patent Number: 5,002,094
[45] Date of Patent: Mar. 26, 1991

[54] HOSE AND CLAMP ASSEMBLY AND METHOD FOR MAKING THE SAME

[75] Inventor: Dennis A. Brovont, McBain, Mich.

[73] Assignee: Cadillac Rubber & Plastics, Inc., Cadillac, Mich.

[21] Appl. No.: 364,087

[22] Filed: Jun. 8, 1989

[51] Int. Cl.⁵ .................................................. F16I 9/00
[52] U.S. Cl. ................................... 138/109; 138/103; 138/138; 138/99; 285/407; 285/365; 285/236; 285/252
[58] Field of Search ................. 138/109, 103, 138, 99; 285/407, 365, 284, 179, 236, 244, 90, 252, 253; 156/381, 383, 70, 66, 213, 214; 264/271.1, 273; 29/418, 423, 458

[56] References Cited

U.S. PATENT DOCUMENTS

| | | |
|---|---|---|
| 2,208,706 | 7/1940 | Spencer . |
| 2,550,186 | 4/1951 | Clamp . |
| 3,043,612 | 7/1962 | Pavlik et al. . |
| 3,365,218 | 1/1968 | Denyes . |
| 3,729,027 | 4/1973 | Bare .................................... 138/109 |
| 4,763,695 | 8/1988 | Dooley ................................ 138/109 |
| 4,776,613 | 10/1988 | Dickey et al. ........................ 29/458 |

Primary Examiner—Harvey C. Hornsby
Assistant Examiner—Gary K. Graham
Attorney, Agent, or Firm—Varnum, Riddering, Schmidt & Howlett

[57] ABSTRACT

A hose and clamp assembly and method of making same. The method comprises the steps of forming a hose, placing a clamp on the hose, forming an elastomeric envelope on the hose about a portion of the clamp and capturing that portion of the clamp, and bonding the envelope to the hose. The hose and clamp assembly comprises a hose, a clamp positioned on the hose, and an elastomeric envelope bonded to the hose and capturing a portion of the clamp.

20 Claims, 2 Drawing Sheets

HOSE AND CLAMP ASSEMBLY AND METHOD FOR MAKING THE SAME

BACKGROUND

1. Field of the Invention.

The invention relates generally to hose and clamp assemblies and, more particularly, to a hose and clamp assembly wherein a clamp is assembled onto a hose with an elastomeric envelope that is bonded to the hose.

2. Description of the Related Art.

Reference will be made in the following description to the radiator hose art in order to facilitate an understanding of the structure, function and significance of the invention. However, and as will become quite apparent hereinafter, the invention may be utilized to advantage in quite different environments.

In the assembly of automotive radiator hoses, it is the typical practice for a hose manufacturer to mold or otherwise suitably form a predetermined length of flexible hose for installation on a particular vehicle in accordance with the distance between the engine block and the radiator fittings to be placed in fluid communication by the use of such hose. The length of the hose is preferably held to a minimum to save material and cost while being just long enough so that the opposite ends of the hose will project over the respective fittings to a sufficient extent to enable a subsequently installed hose clamp to tightly engage the hose ends about the fittings for a fluid-tight connection.

Thus, the respective hose and clamp manufacturers deliver their products to automotive plants where numerous separate storage facilities are required in accordance with the number of different types and sizes of hoses and clamps required to be maintained on hand until a need for them may arise. Similar storage facilities are required on the assembly line. A worker on the assembly line will select different hoses and clamps depending upon the particular vehicle on the assembly line; different kinds and models of vehicles are often assembled on the same assembly line. The worker then assembles the selected hose with the appropriate hose clamps on a given vehicle.

As a typical example of such an assembly operation, in assembling a single radiator hose on a vehicle assembly line, the assembler will first grasp a hose of proper size from one storage area and a pair of clamps from another storage area, assuming that the same size and type of clamp is to be used on opposite ends of the hose as is the usual case. The assembler then slides both clamps onto the hose, manipulates one of the clamps toward one end of the hose, slips that end of the hose over its associated fitting, and tightens the clamp onto the hose and the fitting by using a power-driven screw driver or the like. Thereafter, the worker will shift the other clamp to the other end of the hose to make the other connection in a similar manner. In many instances, one of the clamps is not tightened down at the initial assembly station in which the first clamp is tightened. The free clamp may slide off the hose while the vehicle is in transit to a subsequent assembly station where it is to be tightened.

In the final analysis it is necessary to handle three separate parts as the vehicle moves down the assembly line in assembling each radiator hose, there of course being two such radiator hose and clamp assemblies for each vehicle. During manipulation of the clamps onto the hose during the assembling operation, it is extremely important for the assembly line operator to properly position the clamps at the respective end portions of the hose to insure that, once they are tightened, a proper fluid tight connection results. Notwithstanding the importance of making this fluid tight connection, due to the press of time available on the assembly line while the various parts are being manipulated, it often happens that one or more of the clamps are canted off the end of the hose or otherwise disposed thereon in such a manner as to result in leakage with obvious deleterious consequences.

Contributing to this aspect of the problem with known hose assemblies is the fact that such clamps are very difficult to handle while using the power-driven screw driver to tighten the clamps. That is, the clamp has a tendency to rotate about the axis or body of the hose when engaged with the power-driven screw driver, requiring that the assembly line operator actually grasp the clamp to hold it in position during this operation. Furthermore, and as alluded to above, it often happens that both clamps are not tightened down at the same station at which they are placed on the hose, resulting in the free clamp dropping from the hose while it is in transit to a subsequent station.

Accordingly, three basic methods for assembling a clamp onto the end of a hose have been developed. In one method, the clamp is stapled to the hose. However, this method pierces the hose which can result in the hose tearing when under stress with a subsequent loss of the fluid tight connection. Also, the stapling operation must be carefully controlled in order to assure that the staple does not pierce the interior wall of the hose which could disrupt the fluid tight connection. Further, the damaged materials would have to be replaced, causing great waste.

The second method for assembling clamps onto the end of a hose involves gluing or otherwise adhesively bonding the clamps to the hose surface. However, this method is not durable as the adhesive bond may fracture when the hose and clamp are subjected to flexing such as occurs during installation of the hose into a vehicle.

The third method, which is described in U.S. Pat. No. 3,365,218 entitled Hose and Clamp Pre-assembly, and which was issued on Jan. 23, 1968 to R. T. Dynes, involves a pair of opposed tabs which are molded to the surface of the hose. The hose clamp is received between the molded tabs and held in place until the hose is installed in a vehicle. However, this system requires loosening each clamp prior to the final assembly or holding the clamp diameter to tight tolerances. Finally, this method is inconvenient when working with small clamps.

Therefore, it would be useful to provide a device for assembling a clamp onto a hose that was secure, integral with the hose, and which did not require that the clamp be loosened prior to final assembly. Similarly, it would be useful to provide a means for retaining a clamp on a hose thereby circumferentially and longitudinally orienting the clamp relative to the hose such that neither circumferential rotation nor axial movement of the clamp with respect to the hose is possible.

SUMMARY OF THE INVENTION

The invention relates to a method for making a hose and clamp assembly comprising the steps of forming a hose, placing a clamp on the hose, forming an envelope on the hose and about a portion of the clamp, thereby capturing the clamp, and bonding the envelope to the hose. The envelope is formed from an elastomer which may be adhesively bonded to or integrally vulcanized on the hose. The envelope retains the clamp, thereby circumferentially and longitudinally orienting the clamp on the hose. The clamp can neither rotate circumferentially nor move axially with respect to the hose. The clamp can include a band which encircles the hose and means for facilitating capture by the envelope.

Further, the invention relates to a hose and clamp assembly comprising a hose, a clamp positioned on the hose, and a means for retaining the clamp on the hose wherein the means for retaining the clamp comprises an elastomeric envelope bonded to the hose and capturing a portion of the clamp. The envelope circumferentially and longitudinally retains the clamp, thereby orienting the clamp relative to the hose such that the clamp neither rotates circumferentially nor moves axially with respect to the hose. The envelope can be adhesively bonded to or integrally vulcanized on the hose. The clamp can include a band encircling the hose and means for facilitating capture by the envelope.

BRIEF DESCRIPTION OF THE DRAWINGS

Reference should now be had to the embodiment illustrated in the drawings and described below. In the drawings.

DETAILED DESCRIPTION OF THE PREFERRED EMBODIMENT

The invention relates to a solution of various storage and assembly problems encountered in ultimately providing a fluid tight hose connection between a pair of spaced, fixed fittings of the type employed on automotive vehicles, such as radiator hose connections, fuel filler lines, hose connections for air-conditioning systems, and the like. Consequently, specific reference will be made in the following description to the radiator hose art in order to facilitate an understanding of the structure, function and significance of the invention. However, and as will become quite apparent hereinafter, the invention may be utilized to advantage in quite different environments.

Figure 1:
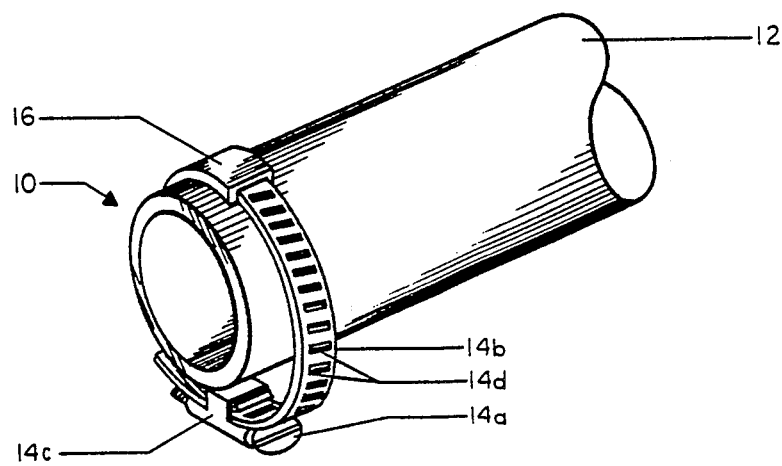
FIG. 1 is a fragmentary perspective view of an automotive radiator hose showing a clamp assembled thereon by way of the invention in the form of an elastomeric envelope.
Figure 2:
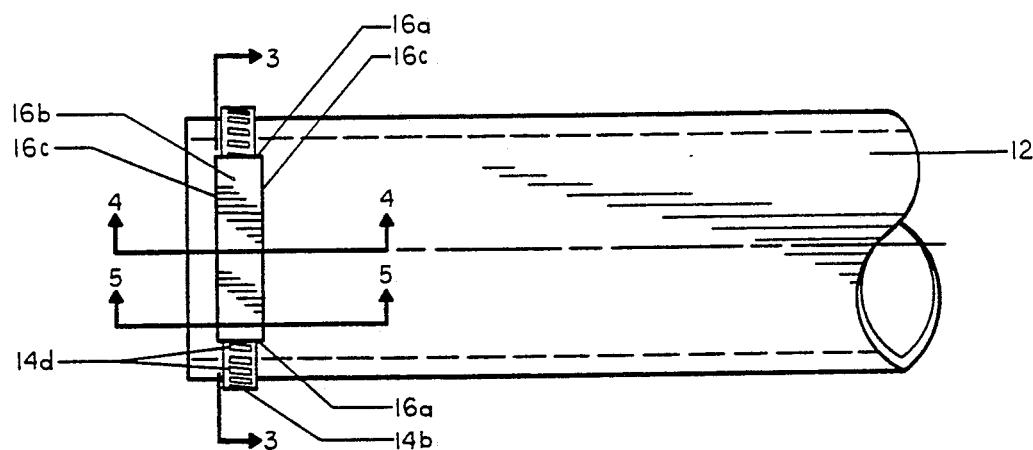
FIG. 2 is a plan view of the invention of FIG. 1.
Figure 3:
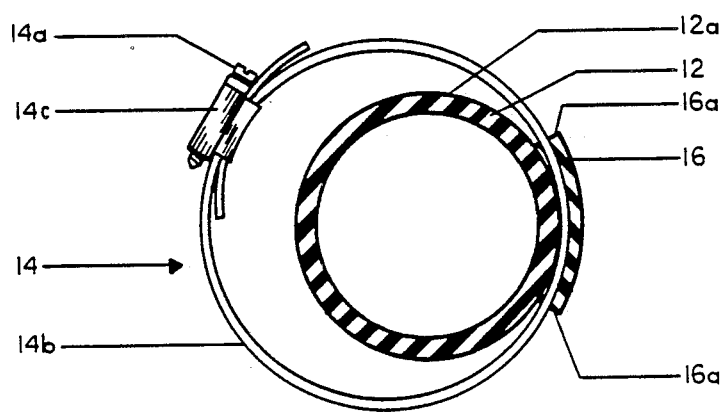
FIG. 3 is a cross-sectional view taken along lines 3—3 of FIG. 2.
Figure 4:
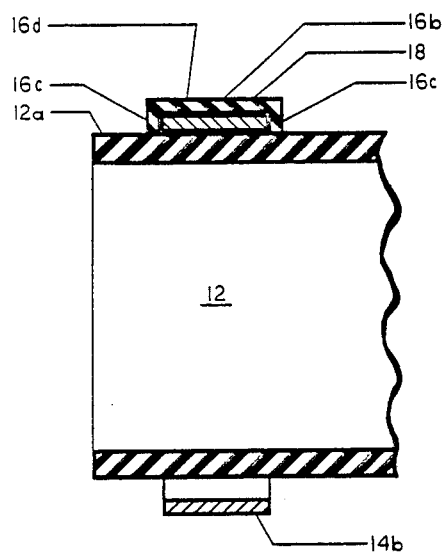
FIG. 4 is a longitudinal sectional view taken along lines 4—4 of FIG. 2.

Turning now to the drawings, and in particular FIG. 1, the invention, in the form of a hose and clamp assembly and designated generally by the reference numeral 10, is shown in conjunction with a hose 12 and a clamp 14. The hose 12 is shown in the form of a radiator hose, it being understood that fuel filler hoses, fuel line hoses, air induction hoses, transmission lines, air injection tubes, drain hoses, washing machine hoses, and fluid or air conveyance tubes or hoses generally may also be assembled according to the invention.

Similarly, the clamp 14 is shown in the form of a conventional radiator hose clamp 14 having a worm screw 14a, a band 14b, a clamp screw housing 14c, and a plurality of slots 14d formed in the band. Again, it should be understood that the hose and clamp assembly 10 is not limited to uses in conjunction with radiator hose clamps. Any clamp, preferably having at least one hole, notch, slot or perforation in the band or having a lug, clamp screw housing, socket, or similar means for enabling or facilitating an elastomeric envelope to adhere to and around or encapsulate or capture a portion of the clamp 14, may be suitably employed.

The clamp 14 is longitudinally and circumferentially retained on the hose 12 by way of a retaining means, which is shown in the drawings in the form of an elastomeric envelope 16. The envelope 16 has opposite ends 16a, a top side 16b, lateral edges 16c, and an underside 16d.

Figure 5:
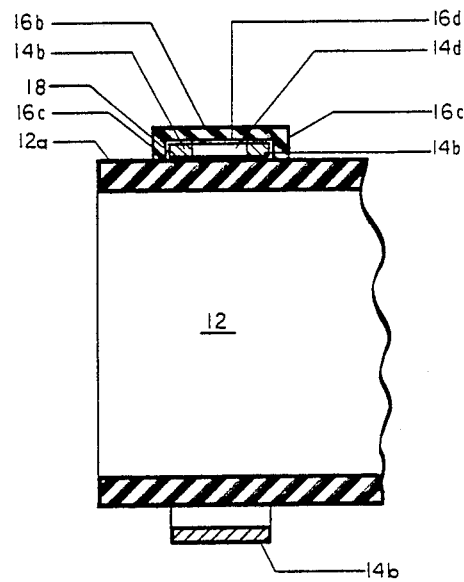
FIG. 5 is a longitudinal sectional view taken along lines 5—5 of FIG. 2 and taken through a slot in a band of the clamp.

As best shown in FIGS. 2 through 5, the lateral edges 16c of the elastomeric envelope 16 are bonded to an outer surface 12a of the hose 12, thereby creating a channel 18 between opposite ends 16a of the envelope 16. The channel 18 forms an elongated passage way between the underside 16d of the envelope 16 and the outer surface 12a of the hose 12. Received in the channel 18 and extending about the circumference of the hose 12 is the clamp 14, which is in a close engaging or adhering relationship with the outer surface 12a of the hose 12 and the underside 16d of the envelope 16 such that circumferential and longitudinal movement of the clamp is restricted. If the clamp 14 includes slots 14d or the like formed in the band 14b, the continuity of the passage way 18 may be interrupted by the envelope extending through the slots and bonding with that portion of the outer surface 12a of the hose 12 underlying the slots, as shown in FIG. 5. The envelope 16 orients and retains the clamp with respect to the circumference and the ends of a hose, captures or encapsulates a portion of the clamp, and is bonded to the hose. The capture or encapsulation of a portion of the clamp 14 by the envelope 16 prevents the clamp from circumferentially rotating or axially moving with respect to the hose.

Figure 6:
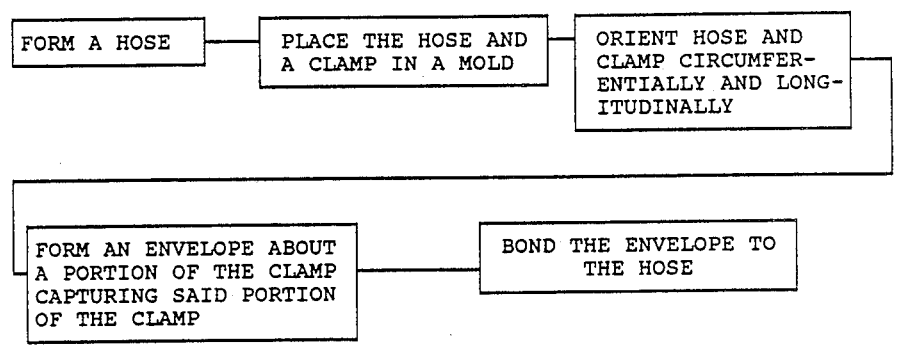
FIG. 6 is a block diagram showing schematically the steps comprising the method according to the invention.

The method for forming the hose and clamp assembly is quick, easy, and employs well-known technology. The method is illustrated schematically in FIG. 6. First, the hose 12 is formed using conventional rubber extrusion techniques typically utilized for the manufacture of such hoses. That is, the hose or tube may be extruded or molded and may be either reinforced or non-reinforced as the application requires. In a typical manufacturing process for the tube or hose, which is described by way of example and not limitation, the appropriate raw materials are assembled and formulated into a "batch" of elastomer. The elastomer "batch" is then extruded or molded to provide the desired hose or tube. The formation of the hose or tube is completed by curing or vulcanizing it to impart the desired flexibility, resiliency, elasticity and strength characteristics. The hose or tube can be cured on a mandrel if it is necessary to provide a contoured shape to the hose. Finally, the hose or tube, if necessary, can be trimmed to the appropriate size.

Following the formation of the hose or tube it is placed in a rubber mold or molding tool into which the clamp has been placed. The hose and clamp are oriented with respect to each other to the desired longitudinal and circumferential position.

The elastomeric envelope is formed by first loading the mold or tool with the stock or batch elastomeric material. Using conventional methods such as compression, injection or transfer molding, the batch material is forced into contact with the hose and clamp to form the envelope. The envelope is then cured and bonded to the hose by vulcanization. Alternatively, the envelope can be first vulcanized to cure the envelope and then adhesively bonded to the hose. Thus a retaining means wherein the lateral edges 16c of the envelope 16 are bonded to the outer surface 12a of the hose 12, and where the envelope 16 adheres to and around and encapsulates or captures a portion the clamp 14 is provided.

If the clamp 14 is formed with at least one hole, notch, slot or perforation in the band or has a lug, socket, clamp screw housing or other protrusion, means for facilitating the capture or encapsulation of a portion of the clamp 14 by the envelope 16 is provided.

The tube or hose 12 and the envelope 16 are preferably formed of the same elastomeric material to facilitate the process of bonding one to the other. However, the hose or tube and the envelope can comprise different materials. Examples of suitable elastomeric materials include but are not limited to ethylene propylene terpolymer, butadiene acrylonitrile, chlorosulfonated polyethylene, chloroprene, epichlorohydrin, polyisoprene, styrene butadiene, chlorinated polyethylene, ethylene acrylic, polysiloxanes, fluorosilicones, polyacrylates, and fluorinated hydrocarbons.

The instant specification and claims are set forth by way of illustration and not limitation. Various modifications and changes may be made without departing from the spirit and scope of the invention. The claims are to be interpreted as broadly as the prior art will allow.

What is claimed is:

1. A method of making a hose-and-clamp assembly comprising the steps of:
    forming a hose;
    placing a clamp on the hose;
    forming an envelope on the hose and about a portion of the clamp to capture said portion of said clamp, the envelope comprising an elastomer bondable to the hose; and
    bonding the envelope to the hose.

2. A method of making a hose-and-clamp assembly according to claim 1 wherein the envelope is integrally vulcanized to the hose.

3. A method of making a hose-and-clamp assembly according to claim 2 wherein the clamp has a band encircling the hose and the envelope retains a portion of the band against circumferential and longitudinal movement relative to the hose, thereby orienting the clamp on the hose.

4. A method of making a hose-and-clamp assembly according to claim 3 wherein the clamp includes means for facilitating capture by the envelope.

5. A method of making a hose-and-clamp assembly according to claim 4 wherein the hose is formed from an elastomer selected from the group consisting of ethylene propylene terpolymer, butadiene acrylonitrile, chlorosulfonated polyethylene, chloroprene, epichlorohydrin, polyisoprene, styrene butadene, chlorinated polyethylene, ethylene acrylic, polysiloxanes, fluorosilicones, polyacrylates, and fluorinated hydrocarbons.

6. A method of making a hose-and-clamp assembly according to claim 5 wherein the envelope is formed from an elastomer selected from the group consisting of ethylene propylene terpolymer, butadiene acrylonitrile, chlorosulfonated polyethylene, chloroprene, epichlorohydrin, polyisoprene, styrene butadiene, chlorinated polyethylene, ethylene acrylic, polysiloxanes, fluorosilicones, polyacrylates, and fluorinated hydrocarbons.

7. A method of making a hose-and-clamp assembly according to claim 1 wherein the envelope is adhesively bonded to the hose.

8. A method of making a hose-and-clamp assembly according to claim 7 wherein the clamp has a band encircling the hose and the envelope retains a portion of the band against circumferential and longitudinal movement relative to the hose, thereby orienting the clamp on the hose.

9. A method of making a hose-and-clamp assembly according to claim 8 wherein the clamp includes means for facilitating capture by the envelope.

10. A method of making a hose-and-clamp assembly according to claim 9 wherein the hose is formed from an elastomer selected from the group consisting of ethylene propylene terpolymer, butadiene acrylonitrile, chlorosulfonated polyethylene, chloroprene, epichlorohydrin, polyisoprene, styrene butadiene, chlorinated polyethylene, ethylene acrylic, polysiloxanes, fluorosilicones, polyacrylates, and fluorinated hydrocarbons.

11. A method of making a hose-and-clamp assembly according to claim 10 wherein the envelope is formed from an elastomer selected from the group consisting of ethylene propylene terpolymer, butadiene acrylonitrile, chlorosulfonated polyethylene, chloroprene, epichlorohydrin, polyisoprene, styrene butadiene, chlorinated polyethylene, ethylene acrylic, polysiloxanes, fluorosilicones, polyacrylates, and fluorinated hydrocarbons.

12. In a hose-and-clamp assembly comprising:
    a hose;
    a clamp positioned on the hose and having a diameter; and
    means for retaining the clamp on the hose,
    the improvement in the means for retaining the clamp comprising a discrete elastomeric envelope bonded to the hose and encapsulating only a portion of the clamp whereby the diameter of the clamp can be selectively increased or decreased relative to the hose.

13. A hose-and-clamp assembly according to claim 12 wherein the clamp further includes a band encircling the hose and a portion of the band is encapsulated by the elastomeric envelope.

14. A hose-and-clamp assembly according to claim 13 wherein the elastomeric envelope retains the band against circumferential and longitudinal movement relative to the hose, thereby orienting the clamp on the hose.

15. A hose-and-clamp assembly according to claim 14 wherein the clamp further includes means for facilitating encapsulation by the elastomeric envelope.

16. A hose-and-clamp assembly according to claim 15 wherein the elastomeric envelope is integrally vulcanized to the hose.

17. A hose-and-clamp assembly according to claim 15 wherein the elastomeric envelope is adhesively bonded to the hose.

18. A hose-and-clamp assembly according to claim 15 wherein the hose is formed from an elastomer selected from the group consisting of ethylene propylene terpolymer, butadiene acrylonitrile, chlorosulfonated polyethylene, chloroprene, epichlorohydrin, polyisoprene, styrene butadiene, chlorinated polyethylene, ethylene acrylic, polysiloxanes, fluorosilicones, polyacrylates, and fluorinated hydrocarbons.

19. A hose-and-clamp assembly according to claim 18 wherein the envelope is formed from an elastomer selected form the group consisting of ethylene propylene terpolymer, butadiene acrylonitrile, chlorosulfonated polyethylene, chloroprene, epichlorohydrin, polyisoprene, styrene butadiene, chlorinated polyethylene, ethylene acrylic, polysiloxanes, fluorosilicones, polyacrylates, and fluorinated hydrocarbons.

20. A hose-and-clamp assembly according to claim 12 wherein the circumferential dimension of the envelope is approximately 25% of the circumferential dimension of the hose.

* * * * *